(12) United States Patent
Silver et al.

(10) Patent No.: US 7,804,886 B2
(45) Date of Patent: Sep. 28, 2010

(54) WEARABLE SYSTEM FOR DATA TRANSMISSION AND RECEPTION AND METHOD OF USING THE SAME

(75) Inventors: Adam J. Silver, San Carlos, CA (US); Steven J. Kuhn, Santa Clara, CA (US); Michael Zung, San Carlos, CA (US)

(73) Assignee: Thetaware, Inc., San Carlos, CA (US)

( * ) Notice: Subject to any disclaimer, the term of this patent is extended or adjusted under 35 U.S.C. 154(b) by 689 days.

(21) Appl. No.: 11/822,857

(22) Filed: Jul. 10, 2007

(65) Prior Publication Data

US 2009/0016418 A1  Jan. 15, 2009

(51) Int. Cl.
H04B 1/38 (2006.01)
(52) U.S. Cl. ...................................... 375/219
(58) Field of Classification Search ......... 375/219–220, 375/295, 316, 377, 259; 455/572, 575.1–575.2, 455/575.6, 575.7
See application file for complete search history.

(56) References Cited

U.S. PATENT DOCUMENTS

| | | |
|---|---|---|
| 5,142,700 A | 8/1992 | Reed |
| 6,725,020 B2 | 4/2004 | Yagi |
| 7,003,317 B2 | 2/2006 | Belcher |
| 7,340,268 B2 * | 3/2008 | Oh et al. ...................... 455/522 |
| 7,546,149 B2 * | 6/2009 | Aerrabotu et al. ........... 455/574 |
| 2006/0245608 A1 * | 11/2006 | Lee et al. ..................... 381/315 |
| 2007/0049360 A1 * | 3/2007 | Birli et al. ................. 455/575.2 |
| 2007/0177629 A1 * | 8/2007 | Yegin ......................... 370/469 |

* cited by examiner

Primary Examiner—Khanh C Tran
(74) Attorney, Agent, or Firm—McKenna Long & Aldridge LLP; Michael I. Angert

(57) ABSTRACT

System having wearable components operable in mobile outdoor conditions and methods of using the same are presented. A system may include at least one speaker, a microphone, a first transceiver coupled to a first antenna, a second transceiver coupled to a second antenna, the first and second transceivers operating under first and second protocols, respectively. A controller and a power source are also provided. In one embodiment, a system may include an audio assembly, a housing assembly, a resilient seal, and a housing receptacle. The housing assembly may be in releasable engagement with the receptacle. A method of controlling a user device in accordance with one embodiment of the invention may include receiving data transmitted according to a second protocol, decoding the data and encoding the decoded data according to a first protocol, different from the second, and then transmitting the encoded data to the user device. The method may also be practiced in the reverse direction.

19 Claims, 15 Drawing Sheets

WEARABLE SYSTEM FOR DATA TRANSMISSION AND RECEPTION AND METHOD OF USING THE SAME

FIELD OF THE INVENTION

The invention relates wearable systems and apparatus for data transmission and reception. More specifically, the invention relates to electronic systems and apparatus for wireless reception and/or transmission of digital communications signals and methods of using the same, where the systems include wearable electronic components that are operable in a mobile environment and in outdoor weather conditions.

BACKGROUND

Secure short-range digital communication systems are becoming ubiquitous in the United States and worldwide. One short-range digital communication protocol known as Bluetooth® enables electronic components, separated by short distances, to transfer data via wireless technology. A Bluetooth® enabled system uses a wireless topology (piconet) that presently requires one master device and allows for up to seven slave devices. A master and slave can establish communication, or can "pair," a method of connecting with encryption and device authentication for voice and other private communications. Multiple masters may co-exist in the same area, but they cannot communicate, as they establish separate piconets on different frequencies. However, because Bluetooth® enabled devices can hop between frequencies, a device can be a slave on more than one piconet, or can even be a master on more than one piconet. This interconnection between wireless networks is called a scatternet, and greatly increases both the range of options and complexity of short-range digital communications protocols, such as Bluetooth®. This protocol has received great acceptance and is used by many electronic devices for short-range digital communication. The exemplary embodiments presented herein may refer to the Bluetooth® protocol and features presently available for use under that protocol, however, nothing herein is intended to limit the use or implementation of the claimed invention to this specific protocol.

Developing and managing multi-slave piconets and scatternets are confusing. What is needed is a system that can function as either a master or a slave device and which has the ability to "pair" with cell phones, other digital communication enabled (e.g., Bluetooth®) devices, and other systems such as itself. A system that can operate in a mobile environment with at least some wearable components exposed to an unsheltered environment in varied weather conditions is desired.

SUMMARY

In one embodiment, a system in accordance with the invention may include at least one speaker, a microphone, a first transceiver to operate under a first protocol, coupled to a first antenna, a second transceiver to operate under a second protocol, different from the first protocol, coupled to a second antenna, a controller coupled to the at least one speaker, the microphone, the first transceiver, and the second transceiver, and a power source coupled to the controller, the first transceiver, and the second transceiver.

In one embodiment, a system in accordance with the invention may include an audio assembly. The audio assembly may include a pair of stereo speakers, a microphone, a single multi-conductor cable that connects each of the stereo speakers and the microphone to a first connector via conductors. The system may also include a housing assembly. The housing assembly may include a housing to separate an exterior space outside of the housing from an interior space inside of the housing. A first transceiver coupled to a first antenna, a second transceiver coupled to a second antenna, a controller coupled to the first and second transceivers, and a battery coupled to the first and second transceivers and the controller, may all be enclosed within the interior space of the housing and are all operably coupled to collectively receive, process, and transmit data. The housing assembly may also include a second connector mechanically coupled to the housing and operably coupled to the first antenna and the second antenna. The second connector may connect to the first connector. The system may further include a resilient seal. Additionally, the system may include a housing receptacle, which may retain the first connector, accept a releasable mechanical engagement with the housing, cooperatively, with the housing, maintain a connection between the first and second connectors when engaged with the housing, and cooperatively, with the housing, maintain pressure on the resilient seal wherein the resilient seal is positioned between the housing and the housing receptacle.

A method of controlling a user device in accordance with one embodiment of the invention may include receiving, from a remote control, data transmitted according to a second protocol, the data corresponding to a user input. Decoding the data and encoding the decoded data according to a first protocol, different from the second. Subsequently, transmitting, to a remote user device, the encoded data according to the first protocol.

The method may further include receiving, from a remote user device, data transmitted according to the first protocol, the data comprising user device data. Decoding at least a portion of the user device data and encoding that portion of the decoded user device data corresponding to user device status according to the second protocol. Transmitting, to the remote control, the encoded user device status according to the second protocol. Subsequently, displaying, on the remote control, the user device data.

BRIEF DESCRIPTION OF THE DRAWINGS

The various features of the invention will best be appreciated by simultaneous reference to the description which follows and the accompanying drawings, wherein like numerals indicate like elements, and in which.

DETAILED DESCRIPTION

Figure 1:
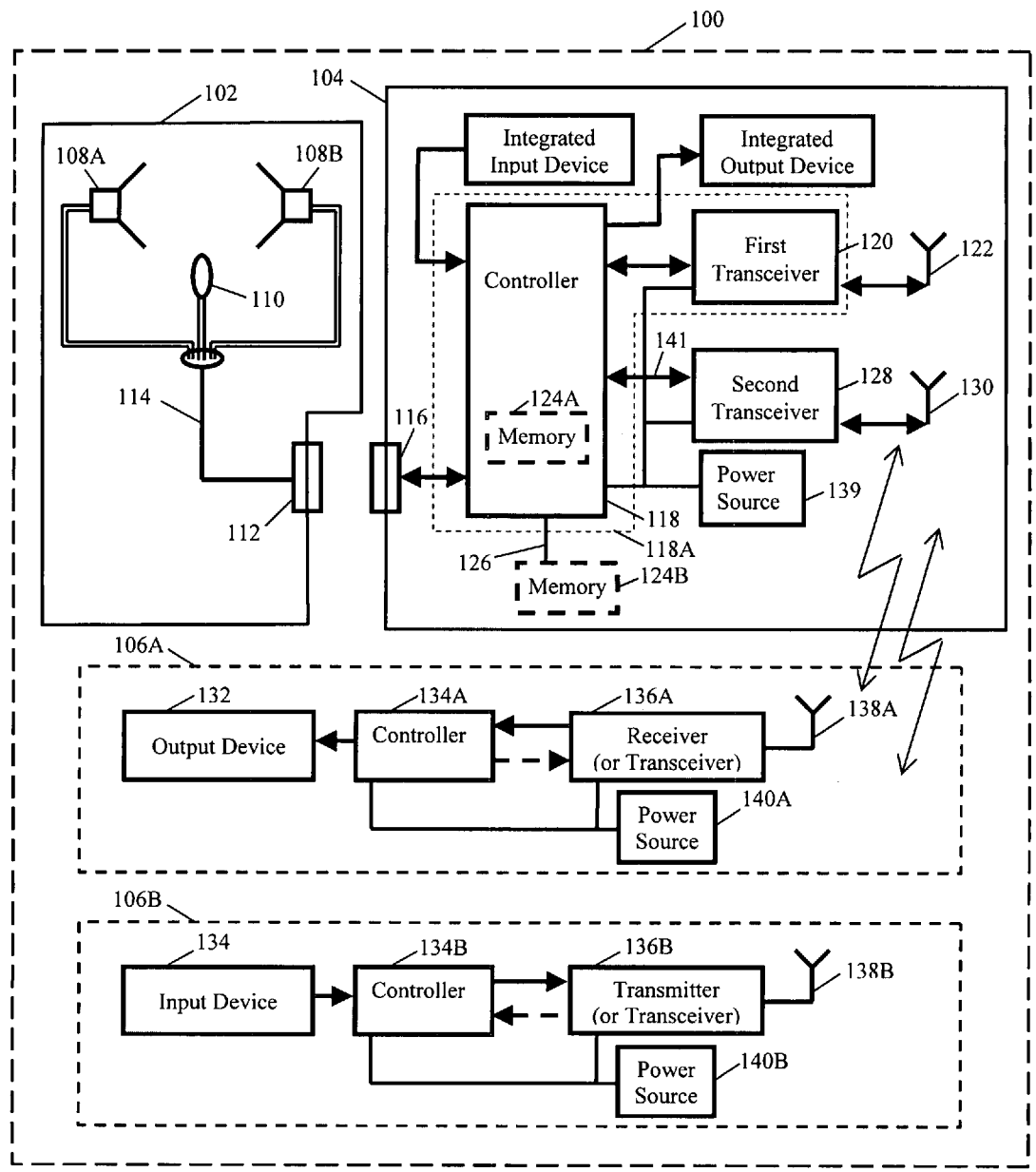
FIG. 1 is a block diagram of a system in accordance with an embodiment of the invention.

FIG. 1 is a block diagram of a system 100 in accordance with an embodiment of the invention. The system 100 may comprise an audio assembly 102 operatively coupled to a wireless transceiver assembly 104. The system 100 may further comprise a wireless remote output assembly 106A and a wireless remote input assembly 106B, each wirelessly coupled to the wireless transceiver assembly 104.

The audio assembly 102 may comprise at least one speaker (e.g., 108A or 108B). The speaker may be worn against an ear of a user or adjacent to the ear with a layer of, for example, foam between the ear and the speaker. The speaker may be a device inserted partially within the ear. The type or configuration of speaker is not intended as a limitation on the claimed invention. In the embodiment of FIG. 1, the audio assembly 102 comprises a pair of speakers 108A, 108B. These speakers 108A, 108B may produce stereo sound and/or may produce monaural sound. The signals driving the speakers may be mixed for simultaneous production of both stereo and monaural sound. For example, a first user may listen to music in stereo using the pair of speakers 108A, 108B while at the same time a monaural tone may be produced from the either or both speakers to signal the occurrence of an event, such as a warning from a radar detector or an incoming call from a mobile telephone. Of course, any audible signal, including voice, may be produced in stereo or monaural format.

The audio assembly 102 may further comprise a microphone 110, an audio assembly connector 112 (alternatively referred to as the "first connector 112"), and a single multi-conductor cable 114 that operationally couples each of the speakers 108A, 108B and the microphone 108 to the first connector 112 via conductors in the multi-conductor cable 114.

The wireless transceiver assembly 104 may include a connector 116 (alternatively referred to as the "second connector 116") that is able to mate with the first connector 112. First connector 112 and second connector 116 may be provided to permit repeated mating of the audio assembly 102 and the wireless transceiver assembly 104.

The wireless transceiver assembly 104 may include at least one control component, such as first controller 118. The wireless transceiver assembly 104 may further include data encoding/decoding and modulation/demodulation components, such as first transceiver 120. The first controller 118 may process data received at the wireless transceiver assembly 104. Data may be received, for example, from a user input device 106B, or any device within a given range, which operates according to at least one communication protocol of the wireless transceiver assembly 104. Data may include commands that may cause the controller to execute code, comprising the steps of a method, in accordance with an embodiment of the invention. The first controller 118 may also process analog input from the microphone 110 by, for example, digitizing an analog signal and formatting the digitized data in accordance with a first short-range digital communication protocol, e.g., Bluetooth®. Digitization may be accomplished by circuitry (not shown) internal or external to the first controller 118. The first controller 118 may also execute code, where the code may relate to standardized system/network functions used in accordance with the first protocol. Such functions may include, for example, acquisition of and synchronization of signals from other systems on a network. The first controller 118 may cause digital data, including but not limited to user data (e.g., commands, music, voice, and the like) and system/network data to be input to a first transceiver 120. First transceiver 120 may encode/modulate and demodulate/decode data for wireless transmission and reception via first antenna 122.

The first controller 118 may receive, via first antenna 122 and first transceiver 120, digital data for processing in accordance with the first protocol. Digital data may include data from devices configured to operate wirelessly in accordance with the first protocol. Such devices may include, for example, cellular telephones, portable media devices (such as MP3 players), and GPS (Global Positioning Satellite) mapping devices. Digital data may also include, for example, data from other systems, identical or similar to system 100, which are configured to operate wirelessly in accordance with the first protocol. Thus, in accordance with an embodiment of the invention, a second user having a microphone and speaker equipped system, which is configured to operate wirelessly in accordance with the first protocol, may establish digital wireless voice communication with the first user. In furtherance of at least voice communications with the second user, the first controller 118 may process digitized voice data, formatted in accordance with the first protocol, received from the second user and convert the processed digitized voice data to an analog signal. Digital-to-analog conversion may be accomplished by circuitry (not shown) internal or external to the first controller 118. The resultant analog signal may be used to drive at least one of the speakers 108A, 108B of system 100.

In one exemplary embodiment of the invention, the first controller 118 is a BlueCoreIII manufactured by CSR (Cambridge Silicon Radio) of Cambridge, UK. Other controllers, such as the BlueCore5 may also be useful. In the exemplary embodiment, the first transceiver 120 is integrated into the first controller 118. This integrated unit is illustrated in FIG. 1 by the dashed line identified as 118A. The first controller 118 or 118A may require non-volatile memory to store code used by the controller to execute the steps of a method in accordance with the invention. Memory may be internal memory 124A that may be included in the hardware of the first controller 118 or 118A or may be external memory 124B, that is external to the first controller 118 or 118A. External memory 124B may be flash memory. The external memory 124B may be coupled to the first controller 118 or 118B by a memory bus 126.

First antenna 122 may be etched onto a circuit board included in the wireless transceiver assembly 104. Alternatively, or in addition, the first antenna 122 may be an external antenna suitable for use with the first transceiver 120. First antenna 122 may be matched for wireless communication with first transceiver 120. Those of skill in the art will understand the selection and operation of transceivers and antennas for use with short-range wireless communications.

As illustrated in the embodiment of FIG. 1, the system 100 may further include a second transceiver 128 operationally coupled to both the first controller 118 or 118A and a second antenna 130. Second antenna 130 may be etched onto a circuit board included in the wireless transceiver assembly 104. Alternatively, or in addition, the second antenna 130 may be an external antenna suitable for use with the second transceiver 128. Second antenna 130 may be matched for wireless communication with second transceiver 128. Those of skill in the art will understand the selection and operation of transceivers and antennas for use with short-range wireless communications.

Second transceiver 128 may be configured to operate according to a second protocol, which is different from the first protocol. Accordingly, in accordance with an embodiment of the invention, the wireless transceiver assembly 104 may be configured to operate under one or more short-range protocols. The second protocol may be an analog or a digital protocol.

The wireless transceiver assembly 104 may utilize the first transceiver 120 and first antenna 122 to communicate with one or more user devices or other systems that are enabled to transmit and receive signals under the first protocol. The wireless transceiver assembly 104 may utilize second transceiver 128 and second antenna 130 to transmit signals to the remote output assembly 106A, as well as receive signals from the remote input assembly 106B, under the second protocol. Communication between second transceiver 128, second antenna 130, and either or both of remote output assembly 106A and remote input assembly 106B may be unidirectional or bi-directional.

For example, the first protocol may be Bluetooth® and the second protocol may be a protocol other than Bluetooth. The second protocol, for example, may be useful in the operation of a low power UHF radio frequency transceiver using a carrier frequency in the ISM (industrial, scientific, medical) and/or SRD (short-range device) bands operating between 315/433/868 and/or 915 MHz. The carrier frequency may adapt to avoid interference with similar units in close proximity. The carrier frequency of the second transceiver 128 may be modulated to implement the second protocol. The second protocol may be used to convey state changes of the control elements, such as manipulation of one or more control elements (e.g., a button, a joystick, a thumb-operated joystick) by a user.

In one embodiment, a user may be a rider/operator of a motorcycle. The second protocol may include message units of information that may include the following elements: unique instance identification, sequence number, message destination identifier, message source identifier, message type, control element state, optional repeat code, error check, and correction codes. A message unit may be repeated for transmission robustness. An acknowledgment message may optionally be sent in the reverse direction of the control message. This protocol may also be used to transmit display messages from the wireless transceiver assembly 104 to a remote output assembly 106A, such as display device (e.g., an LCD display or LED display).

The second protocol may make use of a signal having less data in comparison to the data being carried by the signal under the first protocol. For example, in one embodiment according to the invention, the second transceiver 128 may be used to communicate with remote output and input assemblies 106A and 106B, respectively.

Data transmitted to the remote output assembly 106A may include, for example, data for display on output device 132. Examples of data that may be displayed include, but are not limited to the name of a song, a telephone number, a direction of travel, a system status, and the like. Data transmitted to the remote output assembly 106A may also include data, for example, to illuminate one or more indicator lights on the output device 132.

Data transmitted from the remote input assembly 106B may include, for example, data corresponding to a telephone number, a selection of a user device, a selection of a playlist associated with a user device, and the like. Data for transmission from the remote input assembly 106B may be input by a user using input device 134.

Input device 134 may comprise one or more single or multi-function buttons. The buttons may be implemented, for example, a pushbuttons, joystick-like buttons or controls, or touch screen buttons. Other input devices may alternatively or additionally be used.

Data for signals to and from the remote output and input assemblies 106A, 106B via second transceiver 128 may occupy less signal bandwidth than data for signals to and from the wireless transceiver assembly 104 via first transceiver 120. Transmission and reception of signals under the first and second protocols, via first and second transceivers 120 and 128, respectively, may be simultaneous or non-simultaneous.

Remote output assembly 106A may comprise an output device 132 operationally coupled to a controller 134A. The controller 134A may also be operationally coupled to a receiver (or transceiver) 136A. The receiver (or transceiver) 136A may be operationally coupled to an antenna 138A. The antenna my be internal or external to the remote output assembly 106A, as similarly described with respect to the antennas of first and second transceivers 122, 130. The remote output assembly may also comprise a power source 140A.

Similarly, remote input assembly 106B may comprise an input device 142 operationally coupled to a controller 134B. The controller 134B may also be operationally coupled to a receiver (or transceiver) 136B. The receiver (or transceiver) 136B may be operationally coupled to an antenna 138B. The antenna my be internal or external to the remote output assembly 106A, as similarly described with respect to the antennas of first and second antennas 122, 130.

Wireless transceiver assembly 104, remote output assembly 106A, and remote input assembly 106B may each receive power from power sources 139, 140A, and 140B, respectively. The power sources may be included within each assembly itself. The power source 139, 140A, and 140B may be batteries. The power sources 139, 140A, and 140B may be disposable and/or rechargeable. Selection of power source for each of the wireless transceiver assembly 104, remote output assembly 106A, and remote input assembly 106B, may be influenced by, among other things, the expected usage of each assembly, the type of data to be processed, and the protocol used for processing.

By way of example, a signal making use of a first protocol (e.g., Bluetooth®), previously referred to as the first protocol, may require a controller having a given capability level, a given memory level, and a transceiver capable of a transmitting/receiving signals having a given bandwidth. In contrast, a signal making use of a second protocol, different from the first, may require a controller having a lesser capability level, a lesser memory level, and a transmitter, receiver, or transceiver capable of a transmitting/receiving signals having a lesser bandwidth, all with respect to the first protocol signal. Other factors may also affect selection of type and size of power source 139, 140A, 140B.

For example, wireless transceiver assembly 104 may, as described in the embodiments above, include more than one transceiver. In contrast, remote output assembly 106A may include only one receiver; remote input assembly 106B may include only one transmitter. It will be understood, however, that remote output device 106A and remote input device 106B may use transceivers for two-way communications (to permit, for example, handshaking).

Additionally, remote input assembly 106B or output assembly 106B may be transmitting and receiving data for a lesser percentage of the time, while powered on, in comparison to wireless transceiver assembly 104. Consequently, the power source 139 may be required to deliver more power for a given period of time than power sources 140A or 140B.

Output device 132 may be a low power device, such as an LED display, a single text line LED display, or an LCD display. It is desirable that the output device 132 offer sufficient contrast to allow viewing in sunlight.

Input device 134 may be, for example, a pushbutton, a joy stick, a keypad, a glove capable of providing data signals (for example, by incorporating momentary switches into the fingertips), or any combination thereof. In some embodiments, more than one input device may be used. In one embodiment, the remote input assembly 106B may use, as an input device 134, a push button as an "execute" button and a four-position center-rest joystick for command selection.

Longer life for the power sources 140A and 140B, in comparison to the life of power source 139, may be desirable. In one embodiment, proximity of second transceiver 128 and its antenna 130 to the antenna 138B of remote input assembly 106B (e.g., about one to four feet), may result in a benefit of using a relatively small transmit power level for the remote input assembly 106B. Likewise, the amount of power required for operation of the receiver of the remote output assembly 106A is also small due to the proximity of the second transceiver 128 and its antenna 130 to the antenna 138A of remote output assembly 106A.

In one embodiment, the remote output assembly 106A and remote input assembly 106B may be water resistant or waterproof. In one embodiment, the remote output assembly 106A and remote input assembly 106B may be mechanically mounted to mechanical structure(s). For example, the remote output assembly 106A and remote input assembly 106B may be mounted to a motorcycle handlebar or a ski pole. Mounting may be realized, for example, by mechanical clamps or adhesive. In one embodiment, the remote output assembly 106A and remote input assembly 106B may be mounted to a person or the clothing of a person, for example to a wrist or forearm using an elastic strap.

Figure 2:
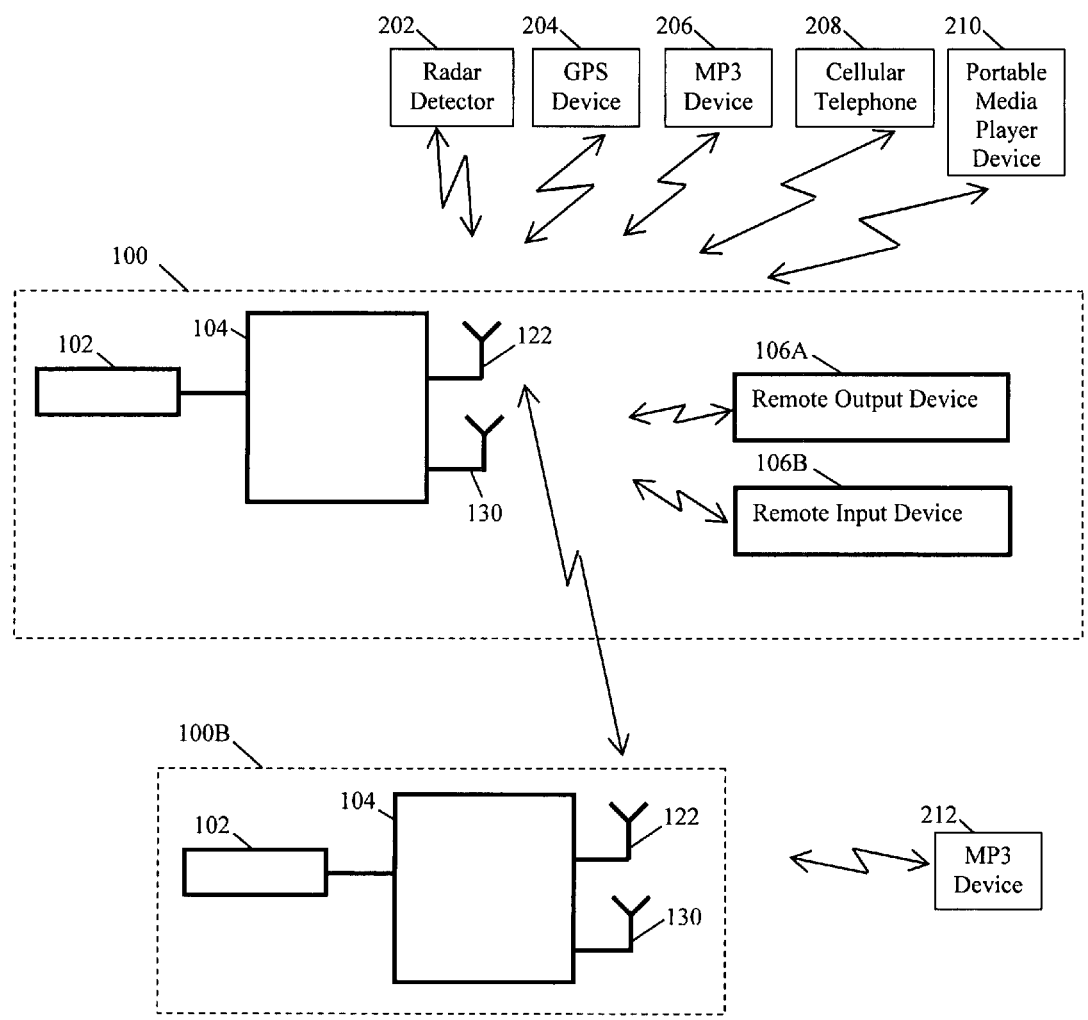
FIG. 2 is a block diagram of a first system in accordance with the embodiment of FIG. 1, in wireless communication with one or more user devices and further in wireless communication with a second system, similar to the first system, all in accordance with an embodiment of the invention.

FIG. 2 is a block diagram of a first system 100 in accordance with the embodiment of FIG. 1, in wireless communication with one or more user devices 202, 204, 206, 208, 210 and further in wireless communication with a second system 100A, similar to the first system, all in accordance with an embodiment of the invention. Components 102, 104, 122, 130, 106A, and 106B are as described in the text accompanying FIG. 1.

As shown in the illustration of FIG. 2, a first system 100 may be in communication with, for example, one or more user devices such as a radar detector 202, a GPS device 204, an MP3 device 206, a cellular telephone 208, and a portable media player device 210. Simultaneously, the first system 100 may be in communication with a second system 100A. The second system 100A may be in communication with one or more user devices. In the illustration of FIG. 2, the second system 100A is in communication with a single user device 212 (an MP3 device). While user devices 206 and 212 are both MP3 devices, they are not necessarily identical devices. The user of the first system 100 may be listening to programming from MP3 device 206, while the user of the second system may be listening to separate programming from MP3 device 212. The user of the first system 100 may hold a two-way conversation with the user of the second system by virtue of the wireless coupling of each user's audio assembly 102 to the other user's audio assembly 102. By way of example, the user of the first system 100 may be a first motorcycle operator while the user of the second system 100A may be a passenger traveling on the motorcycle of the first motorcycle operator. In such a configuration, the user of the second system 100A does not require an output assembly (similar to 106A) or an input assembly (similar to 106B). Nothing herein, however, should be construed as precluding the user of the second system from having and/or using such assemblies.

Figure 3:
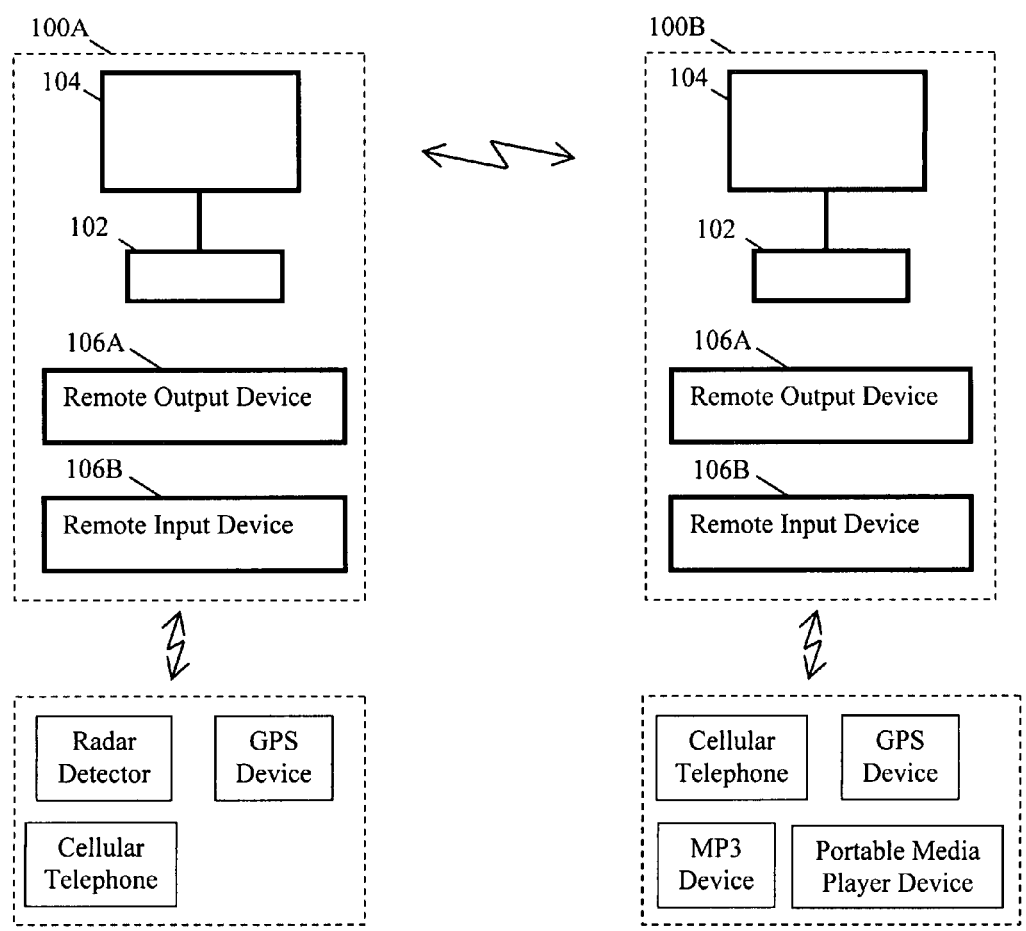
FIG. 3 is a block diagram of a first system and a second system, each similar to the system in accordance with the embodiment of FIG. 1, where the first system maintains wireless communication with one or more first system user devices, the second system maintains wireless communication with one or more second system user devices, and the first and second systems maintain wireless communication with each other, all in accordance with an embodiment of the invention.
Figure 4A:
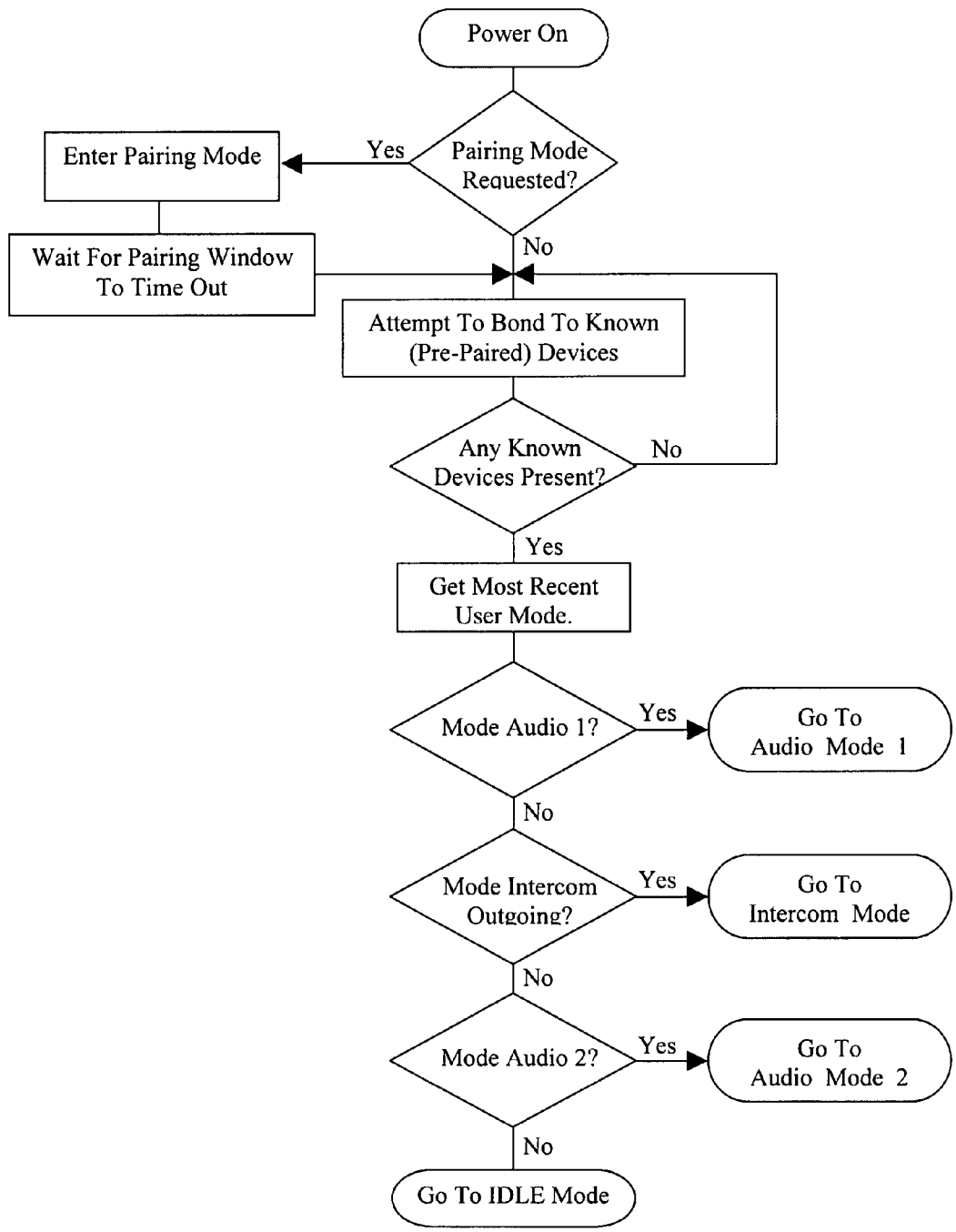
FIGS. 4A-4G are flow diagrams of a method in accordance with an embodiment of the invention.
Figure 4B:
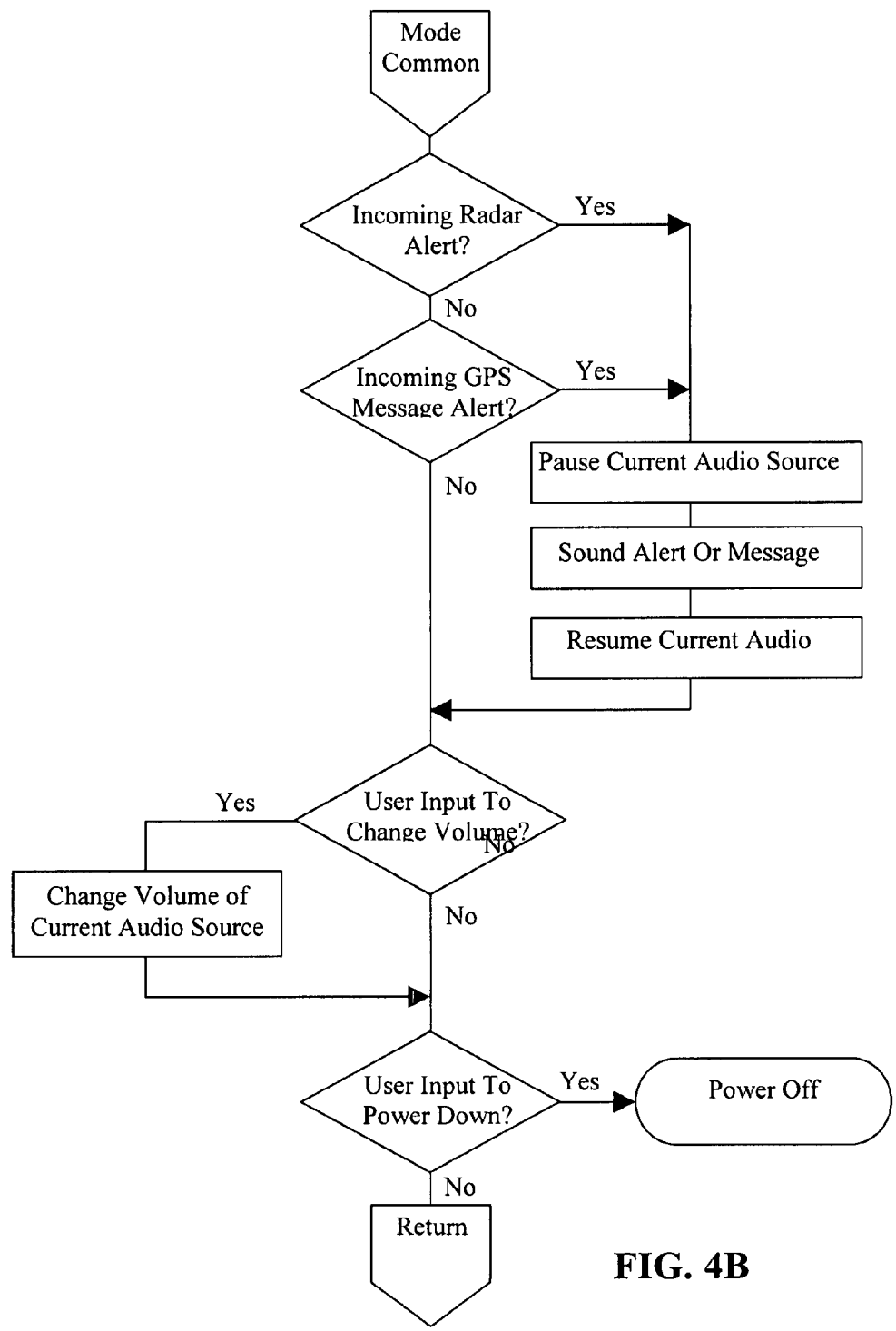
Figure 4C:
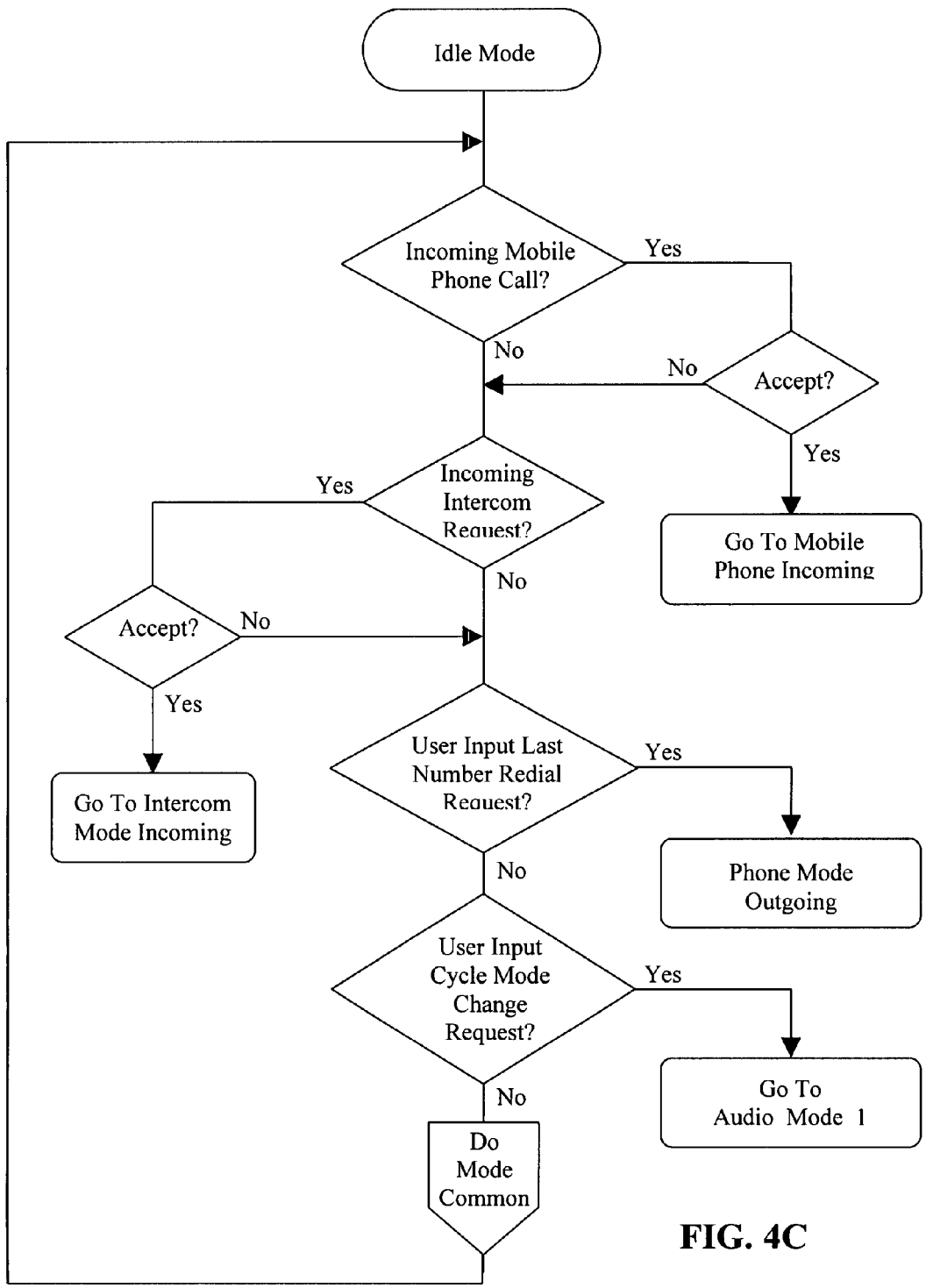
Figure 4D:
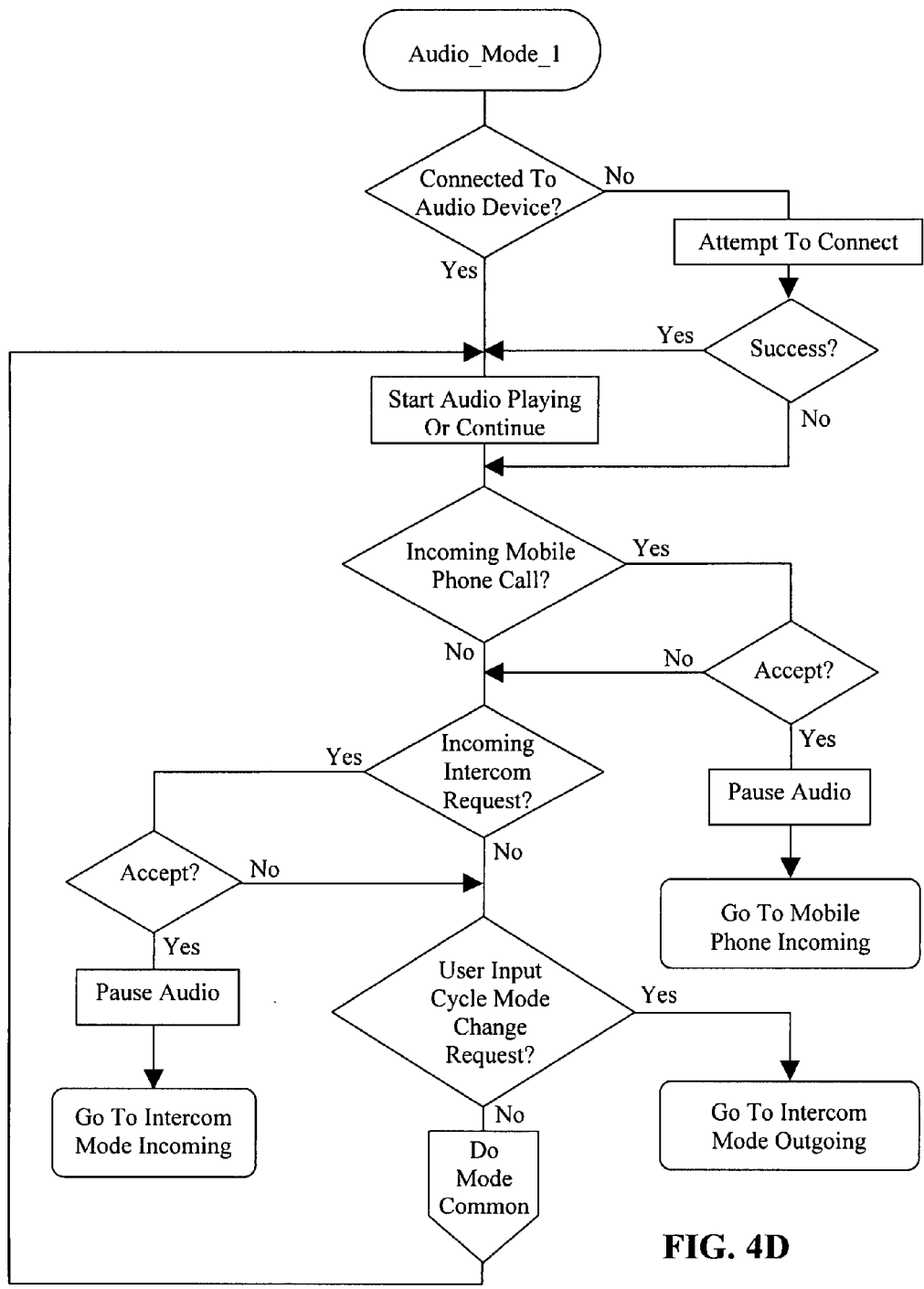
Figure 4E:
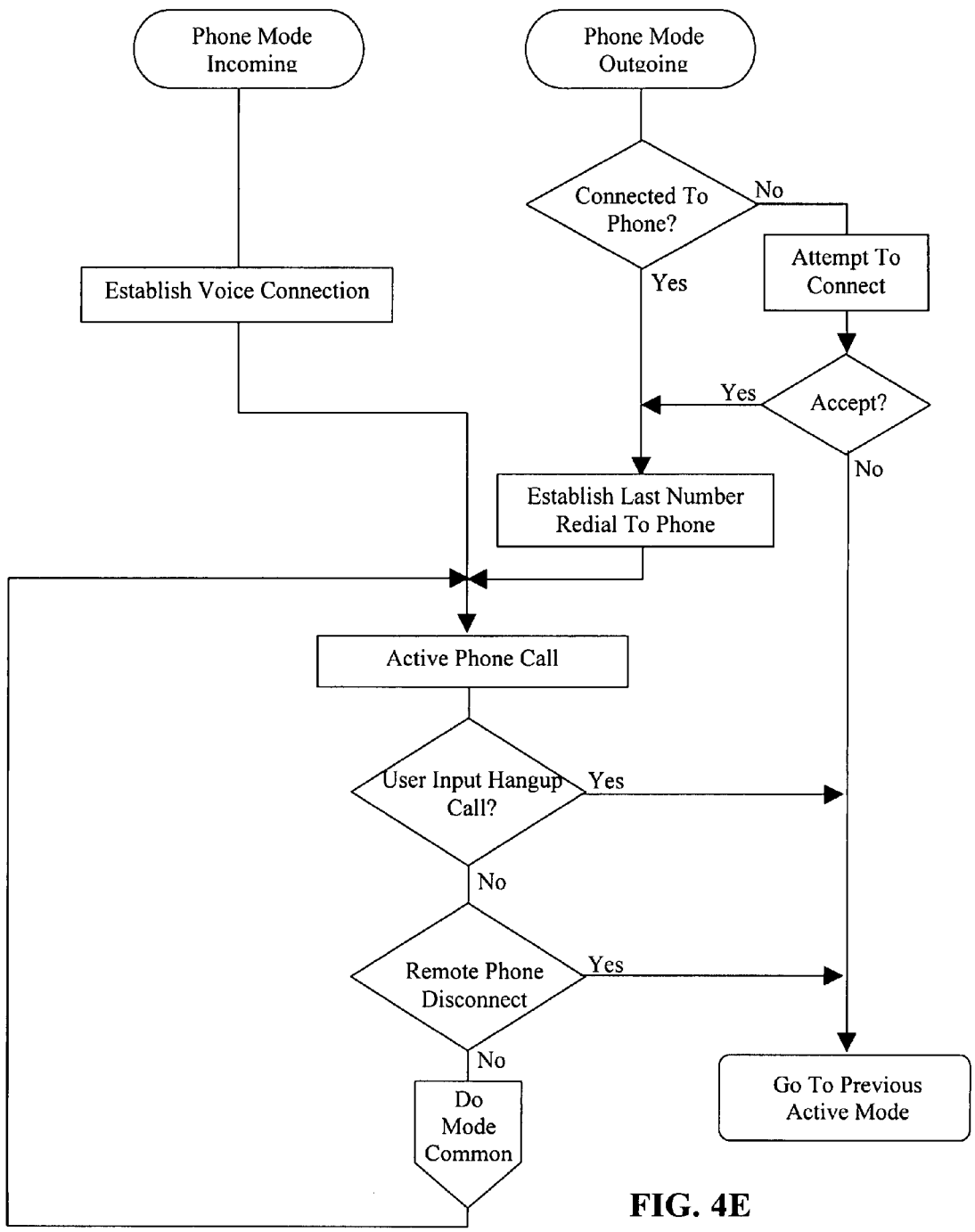
Figure 4F:
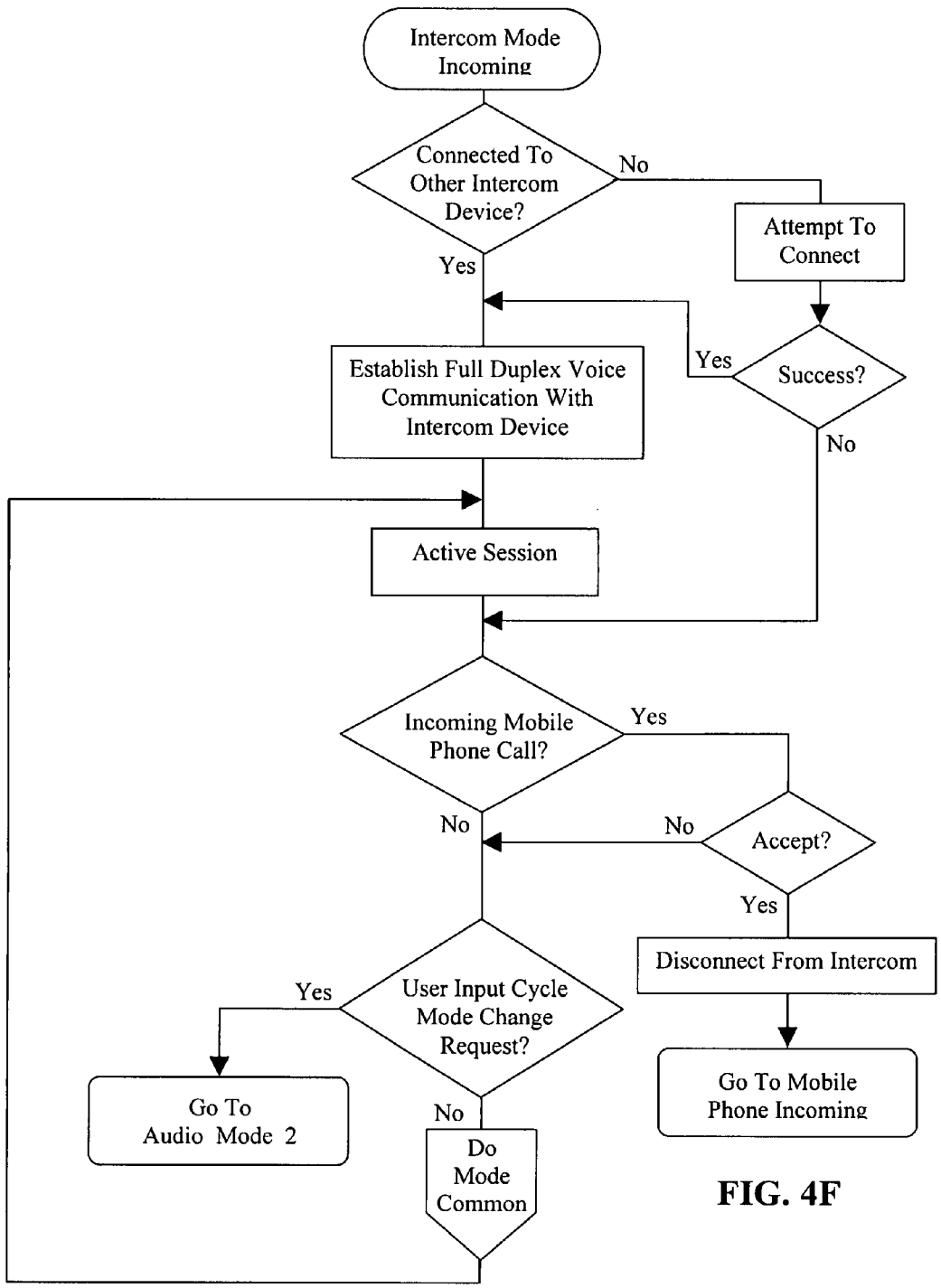
Figure 4G:
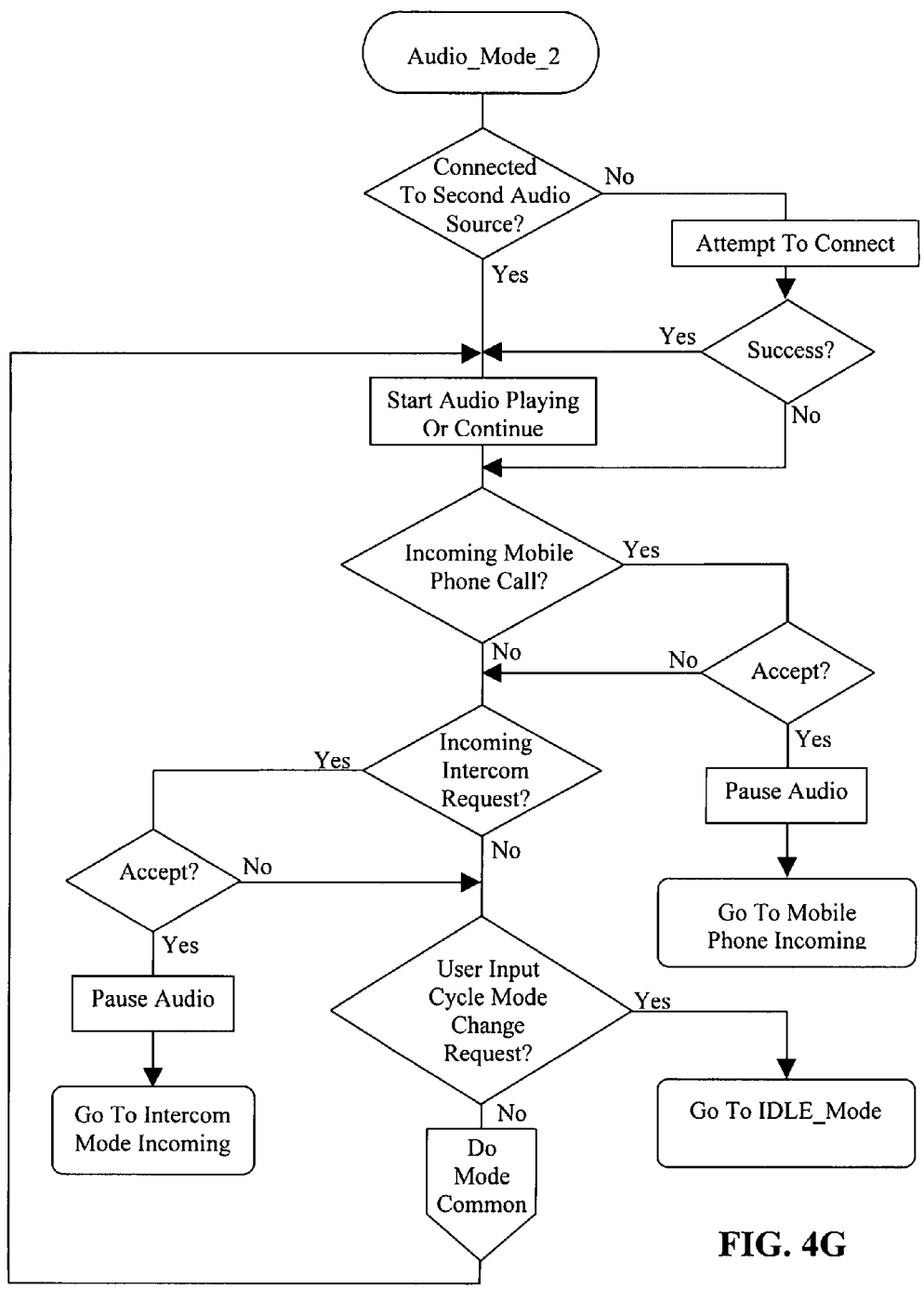

FIG. 3 is a block diagram of a first system 100A and a second system 100B, each similar to the system 100 in accordance with the embodiment of FIG. 1. In the embodiment of FIG. 3, the first system 100A maintains wireless communication with one or more first system user devices, the second system 100B maintains wireless communication with one or more second system user devices, and the first 100A and second 100B systems maintain wireless communication with each other. Each of the first and second systems may have and/or use independent output assemblies (similar to 106A) and input assemblies (similar to 106B) in accordance with the embodiment described in FIG. 1. By way of example, the user of the first system 100A may be a first motorcycle operator while the user of the second system 100B may be a second motorcycle operator or a passenger traveling on the motorcycle of the first motorcycle operator.

FIGS. 4A-4G are flow diagrams of a method in accordance with an embodiment of the invention.

Figure 5:
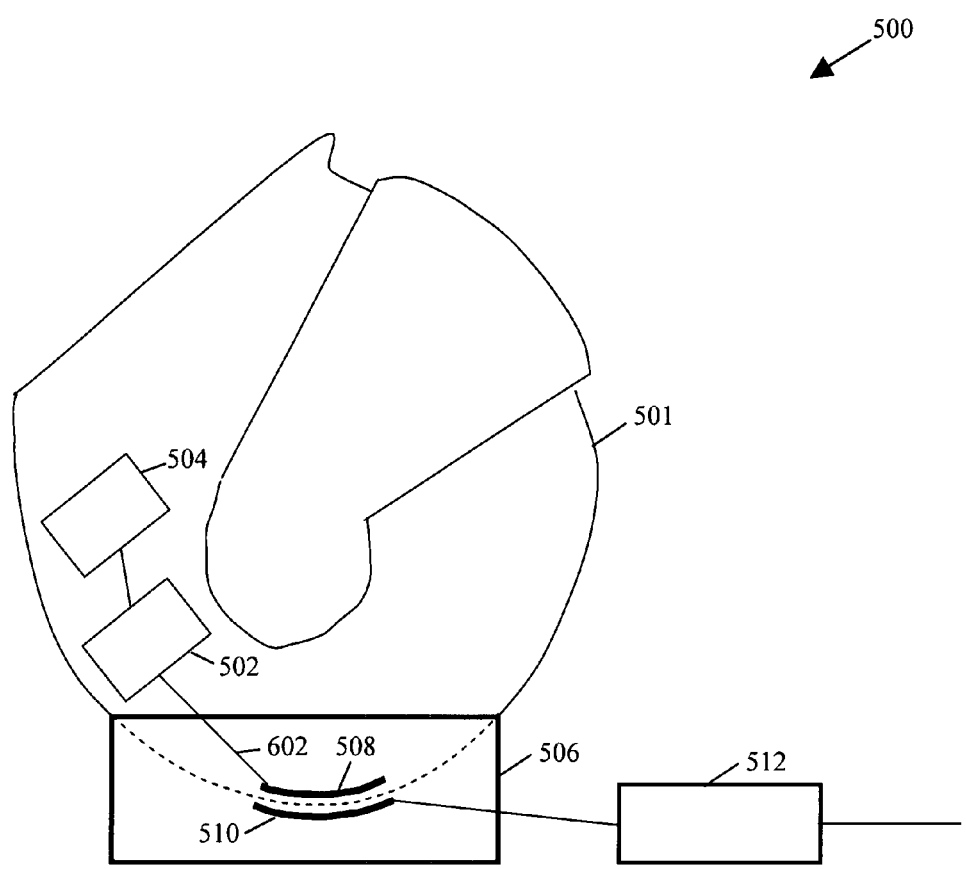
FIG. 5 illustrates a system 500 to recharge a power source of the system in accordance with an embodiment of the invention.

FIG. 5 illustrates a system 500 to recharge a power source of the system in accordance with an embodiment of the invention. The system 500 includes a motorcycle helmet 501 and components 502 and 504, similar to components 102 and 104 of FIG. 1. The system 500 further includes a cradle 506, where the helmet 502 and the cradle 506 include power-coupling elements 508 and 510, respectively. The system 500 further includes a power charging control unit 512. In operation, the power charging control unit 512 may be supplied with power, such as AC power, from a household power source. The power charging control unit 512 may include an AC to DC converter (not shown).

Figure 6:
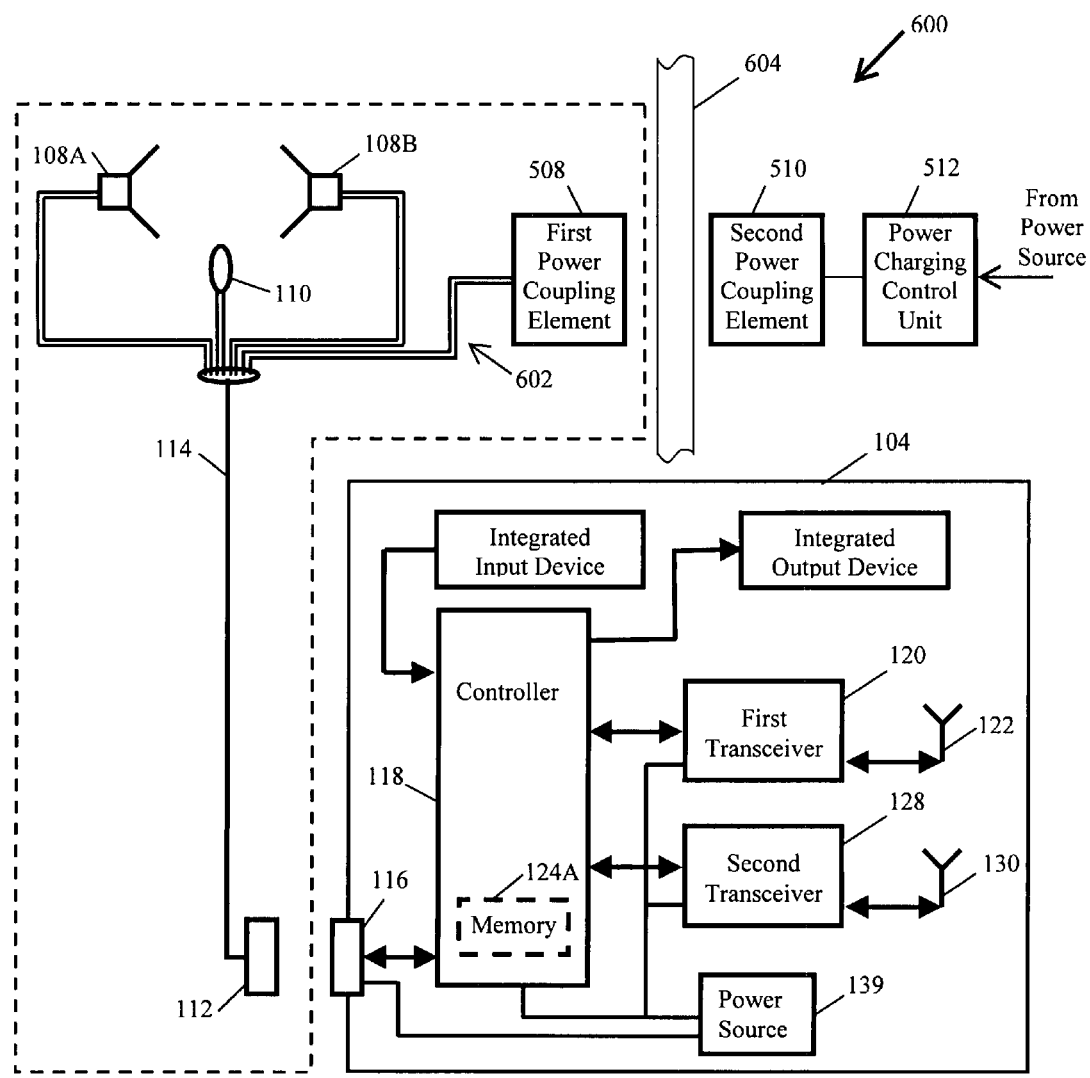
FIG. 6 is a block diagram of a system 600, according to one embodiment of the invention.

FIG. 6 is a block diagram of a system 600, according to one embodiment of the invention. FIG. 6 illustrates the integration of the power coupling elements 508 and 510, depicted in FIG. 5, into the system 600 according to one embodiment of the invention.

Components of FIG. 6 bearing the same reference numbers as those in FIG. 1 are as described in the text accompanying FIG. 1. A first power-coupling element 508 may be connected via wire(s) 602 in cable 114 to first connector 112. A second power-coupling element 510 is a counterpart to the first power-coupling element 508. The first power-coupling element 508 and second power-coupling element 510 may comprise an inductive or capacitive energy transfer system. In one embodiment, the first and second power-coupling elements 508, 510 do not make physical contact with each other. In operation, first and second power coupling elements 508, 510 are separated by a thickness of material 604. In one embodiment, the material 604 is a non-ferrous material. Material 604 may be a material that is used as a shell on protective headwear. Examples of protective headwear include helmets, such as sports helmets, motorcycle helmets, and the like. Examples of material 604 may include, for example, high impact plastic, Nylon®, and Kevlar®.

In the embodiments of FIGS. 5 and 6, certain components of the system 500, 600 may be installed in a helmet 501, such as a motorcycle helmet 800. The helmet's shell may be comprised of a material 604 as described in relation to FIG. 6. In accordance with an embodiment of the invention, the motorcycle helmet 501 may be placed into the cradle 506. Cradle 506 may be adapted to hold a helmet, such as the motorcycle helmet 501 of FIG. 5. The cradle 506 also provides support for the second power-coupling element 510. The cradle 506 supports the helmet 501 such that the first power-coupling element 508 is substantially adjacent to its counterpart—the second power-coupling element 510. Second power coupling element 510 may be coupled to a primary power source, such as a household electric supply via the charging control unit 512. Electrical current flowing through the second power-coupling element 510 creates an electromagnetic field (not shown) that emanates from the second power-coupling element 510. The electromagnetic field may pass through the material of the helmet's shell and cause electrical current to flow in first power-coupling element 508. Thus, the electromagnetic field causes electric current to flow through the circuit comprised of wire(s) 602 and power source 139, thus charging power source 139. It will be understood that other components may be included in the charging circuit path, such as over charge protection circuits and safety elements; however, they are not included in the illustrations of FIGS. 5 and 6 for the sake of clarity.

Figure 7A:
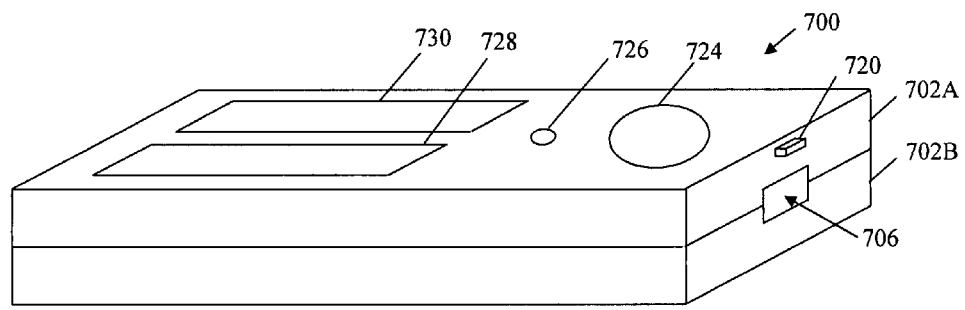
FIG. 7A is a perspective view of an apparatus in accordance with an embodiment of the invention, from a first observation angle.

FIG. 7A is a perspective view of an apparatus in accordance with an embodiment of the invention, from a first observation angle. The apparatus 700 may comprise an upper housing 702A and a lower housing 702B. The apparatus 700 may provide a fully or partially enclosed space 704, FIG. 7C for components (not shown), including mechanical and electrical components such as, but not limited to the components described in connection with wireless transceiver device 100. The enclosed space 704 of the apparatus 700 may be a water resistant or waterproof space. In some embodiments, the apparatus 700 may be provided with a first opening 706 having a housing connector 708 (similar to 120, FIG. 1) disposed therein. Housing connector 708 is omitted from the illustration of FIGS. 7A and 7B for clarity. FIG. 7C illustrates, among other things, cross-sectional view of housing connector 708. Housing connector 708 may include electrical contacts that may be used, for example, for analog and/or digital input/output and/or power.

Figure 7B:
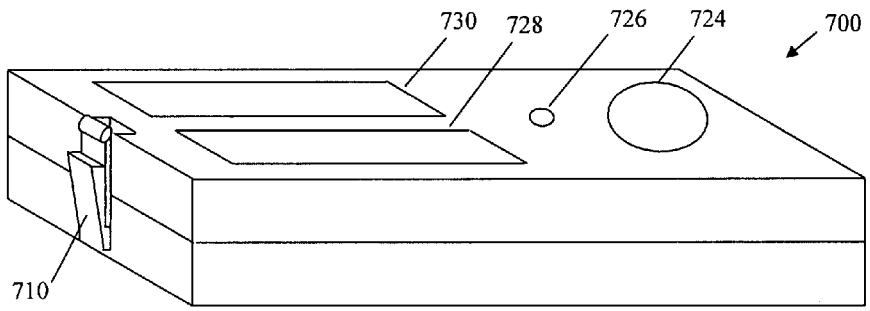
FIG. 7B is a perspective view of the apparatus of FIG. 7A from a second observation angle.
Figure 7C:
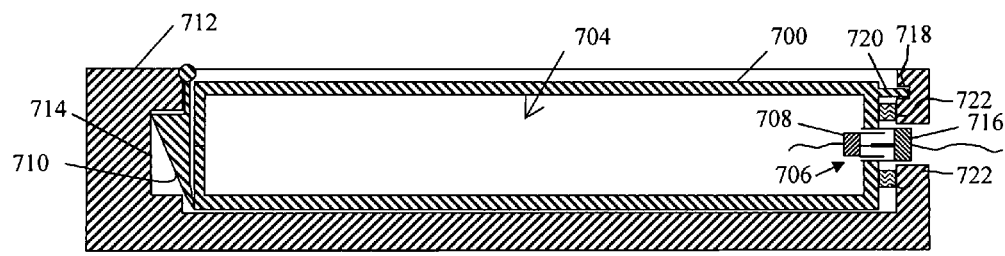
FIG. 7C is a cross sectional view of the apparatus of FIGS. 7A and 7B, in accordance with an embodiment of the invention.

FIG. 7B is a perspective view from a second observation angle of the apparatus of FIG. 7A, in accordance with an embodiment of the invention. A latch 710 may be coupled to or integrated with a side of the housing 702A, 702B that is opposite to the side of the housing containing the first opening 706. The latch 710 may be may be manufactured from a resilient material. In one embodiment, the latch 710 and the lower housing 702B are injection molded as one piece. Latch 710 may provide a mechanism to secure the apparatus 700 into a receptacle 712.

FIG. 7C is a cross sectional view of the apparatus 700 of FIGS. 7A and 7B, in accordance with an embodiment of the invention. FIG. 7C also illustrates a cross sectional view of the receptacle 712, in accordance with an embodiment of the invention. In FIG. 7C, the apparatus 700 is illustrated in engagement with a receptacle 712. Receptacle 712 may comprise a structure to receive apparatus 700 and an audio assembly connector 716. Audio assembly connector 716 may be integral to the receptacle 712 or may be removable therefrom. Latch keeper 714 may be integrated into the receptacle 712. Receptacle 712 may also include a feature, such as a recess 718, mechanically adapted to assist in retaining and/or aligning the apparatus 700 in the receptacle 712. For example, a boss 720, protruding from apparatus may securely fit into the recess 718 for retention and/or alignment of the apparatus 700. Audio assembly connector 716 of receptacle 712 is illustrated in an inserted position within housing connector 708 of apparatus 700. Resilient seal 722 may be compressed between the apparatus 700 and the receptacle 712, thus forming a seal. In one embodiment, the resilient seal may be compressably mounted on the apparatus 700. In another embodiment, the resilient seal may be compressably mounted on the receptacle 712. Compression of resilient seal 722 may be realized via force exerted by latch 710 against the wall of the receptacle 700 opposite to the audio assembly connector 716. Thus, latch 710 may push against an inside wall of latch keeper 714, forcing apparatus 700 toward audio assembly connector 716. Consequently, resilient seal 722 may be compressed by the pressure applied to its faces by apparatus 700 in cooperation with receptacle 712. This provision of pressure may be useful in obtaining a predefined level of water resistance or waterproofing for apparatus 700.

Resilient seals of varying form factors and compositions are within the bounds of this invention. Resilient seals may be made from water resistant or waterproof material, such as silicone. Resilient seals may be in standard shapes of, for example, circles, squares, or rectangles. Resilient seals may also be in non-standard shapes. Cross sections of resilient seals may be realized, for example, in "O" shape, "D" shape, or square. Resilient seals in standard and non-standard shapes may be made from flat sheet stock of resilient material. Those of skill in the art will understand how to select the shape, cross section, and material to be used for a resilient seal in accordance with the invention. The resiliency of and amount of pressure to be applied to the resilient seal should preferably be sufficient to cause the seal to occupy any space that would allow water to bypass the seal and enter the interior of the housing from the exterior. As used herein, a water resistant seal to separate the interior from the exterior of the housing would satisfactorily prevent any water from entering the interior of the housing when the housing was at sea level, outdoors, and traveling horizontally at ten miles per hour in the equivalent of a moderate rain shower. As used herein, a waterproof seal to separate the interior from the exterior of the housing would satisfactorily prevent any water from entering the interior of the housing when the housing was at sea level, outdoors, traveling horizontally at approximately sixty miles per hour in the equivalent of a moderate rain shower. These may roughly represent an operational use of a system in accordance with an embodiment of the invention, on a person standing, walking, or running, or traveling in a moving vehicle in a rain shower a moving vehicle. Such conditions may be found in a typical sports environment or by a rider of a motorcycle.

Figure 8A:
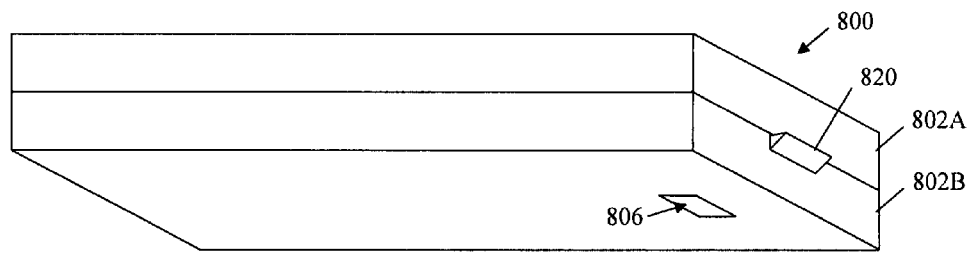
FIG. 8A is a perspective view of an apparatus in accordance with an embodiment of the invention, from a first observation angle.
Figure 8B:
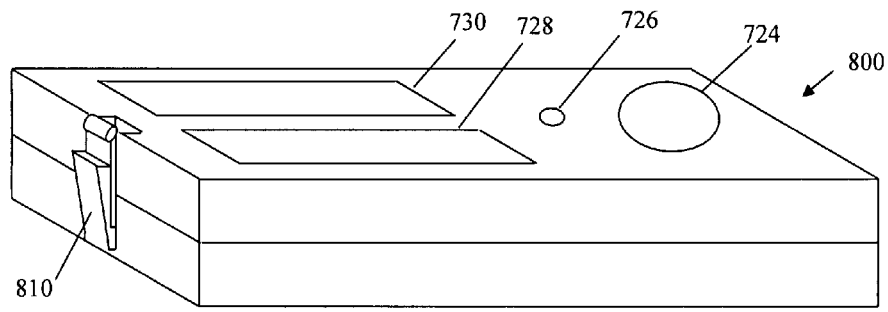
FIG. 8B is a perspective view from a second observation angle of the apparatus of FIG. 8A, in accordance with an embodiment of the invention.
Figure 8C:
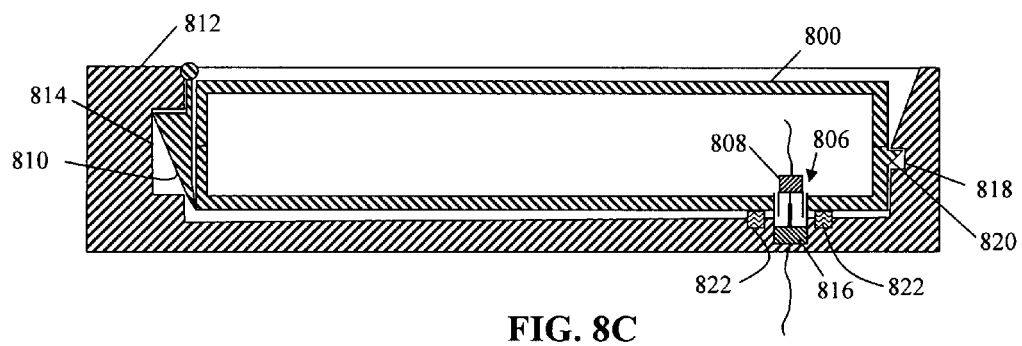
FIG. 8C is a cross sectional view of the apparatus of FIGS. 8A and 8B, in accordance with an embodiment of the invention.

FIG. 8A is a perspective view of an apparatus 800 in accordance with an embodiment of the invention, from a first observation angle. The embodiment of FIGS. 8A-C are similar to the embodiment of FIGS. 3A-C, however the first opening 306 of FIG. 3 is no longer on a sidewall of the housing 302A, 302B. In the embodiment of FIGS. 8A-C, a first opening 806 is located on the bottom of apparatus 800.

FIG. 8B is a perspective view from a second observation angle of the apparatus of FIG. 8A, in accordance with an embodiment of the invention. A latch 810 may be coupled to or integrated with a wall of the housing 802A, 802B that is perpendicular to the wall containing the first opening 806. The latch 810 may be may be manufactured from a resilient material. In one embodiment, the latch 810 and the lower housing 802B are injection molded as one piece. Latch 810 may provide a mechanism to secure the apparatus 800 into the receptacle 812.

FIG. 8C is a cross sectional view of the apparatus 800 of FIGS. 8A and 8B, in accordance with an embodiment of the invention. FIG. 8C also illustrates a cross sectional view of the receptacle 812, in accordance with an embodiment of the invention. In FIG. 8C, the apparatus 800 is illustrated in engagement with a receptacle 812. Receptacle 812 may comprise a structure to receive apparatus 800 and an audio assembly connector 816. Latch keeper 814 may be integrated into the receptacle 812. Receptacle 812 may also include a feature, such as a recess 818, mechanically adapted to assist in retaining and/or aligning the apparatus 800 in the receptacle 812. For example, a boss 820, protruding from apparatus may securely fit into the recess 818 for retention and/or alignment of the apparatus 800. Audio assembly connector 816 of receptacle 812 is illustrated in an inserted position within housing connector 808 of apparatus 800. Resilient seal 822 may be compressed between the apparatus 800 and the receptacle 812, thus forming a seal. In one embodiment, the resilient seal may be compressably mounted on the apparatus 800. In another embodiment, the resilient seal may be compressably mounted on the receptacle 812. Compression of Resilient seal 822 may be realized via a force exerted in substantially the same direction by latch 810 and boss 820 against the upper wall of latch keeper 814 and recess 818, respectively. This force is opposed by a force in substantially the opposite direction, exerted by the floor of the receptacle 812 onto the resilient seal 822 and onto the apparatus 800, forcing apparatus 800 toward audio assembly connector 816. Consequently, resilient seal 822 may be compressed by the pressure applied to its faces by apparatus 800 in cooperation with receptacle 812. This provision of pressure may be useful in obtaining a predefined level of water resistance It will be understood that FIGS. 7A, 7B, 7C, 8A, 8B, and 8C are for illustrative purposes only and are not limiting as to the scope of the invention. For example, the shape and/or location of first opening 706, 806 may be changed without departing from the scope of the invention. For example, the shape of first opening 706, 806 may be rectilinear, circular, or a combination thereof. Additionally, as understood to those of skill in the art, the location of the first opening 706, 806 could be changed, without departing from the scope of the invention. Moreover, the first opening 706 may or may not bridge the joint between the upper and lower housings 702A, 702B.

In some embodiments having a first opening 706, 806, water resistance or waterproof integrity of the apparatus 700, 800 may be achieved when the housing connector 708, 808 is mated with its counterpart audio assembly connector 716, 816. In some embodiments having a first opening 706, 806, water resistance or waterproof integrity of the apparatus 700, 800 may be achieved regardless of whether the housing connector 708, 808 is mated with its counterpart audio assembly connector 716, 816. That is, the apparatus 700, 800, including the housing connector 708, 808, may be water resistant or waterproof on its own. In some embodiments having a first opening 706, 806, water resistance or waterproof integrity of the apparatus 700, 800 may be achieved via the addition of a resilient seal 722, 822 which, in operation, seals the enclosed space 704 of the apparatus 700, 800 from the ambient environment that surrounds it.

Apparatus 700, 800 may further include additional openings that may be used to define locations of optical, mechanical, electromechanical, or electro optic devices, such as status light(s) and switch(es), or components thereof. In the embodiments of FIGS. 7 and 8, a second, third, fourth and fifth openings 724, 726, 728, and 730, respectively are illustrated. In one embodiment, second opening 724 may receive a pushbutton that may function as a switch. This switch may be a momentary type switch that can be used as a multifunction button. In one embodiment, third opening 726 may receive a lightpipe or another component that may emit light when apparatus 700, 800 is in an operable state. The lightpipe or other light emitting device may be used to indicate a power condition and/or may be used to communicate status of the apparatus 700, 800 to a user. In one embodiment, fourth and fifth openings 728 and 730 may be used to receive pushbuttons that may function as switches. These switches may be momentary type switches that can be used to increase and decrease the amplitude of an audio signal transmitted from the apparatus 700, 800. Openings 724, 726, 728, and 730 may be sealed with a membrane or gasket (not shown) to maintain the water resistant or waterproof integrity of the apparatus 700, 800.

In one embodiment according to the invention, an audio assembly may be installed in a helmet, such as a motorcycle helmet. The audio assembly may include a first connector, which mates to a second connector that may be mounted to a housing. The housing may be mounted to the helmet via a housing receptacle. The housing may include circuitry, such as, at least a controller, a transceiver, a battery, and an antenna, which may be all enclosed within the housing. The housing may have a water resistant or waterproof level of integrity once it may be securely engaged to the housing receptacle.

In one embodiment, a remote control apparatus, or a remote output assembly and a remote input assembly, may be mounted, for example, on a handlebar of a motorcycle. In one embodiment, the remote control apparatus may be mounted on the left side handlebar, in such a manner as to allow a user to manipulate a data input device (e.g., pushbutton and/or joystick) with his or her left thumb.

The circuitry within the housing may utilize wireless technology and open source communication protocol, such as Bluetooth®, to receive both mono and stereo audio, and to send control signals to devices, such as portable media player devices, cellular telephones, and GPS receivers that may be in communication with the circuitry. These devices may be enabled to use the communication protocol.

In an embodiment in which an audio device may be coupled to the system, the audio may be played through high-performance transducers or bone conduction, for superior signal-to-wind noise levels when compared to standard transducers. The microphone included with the audio interface may support voice for cell phone, or local person-to-person conversation, such as when two riders travel in tandem on one motorcycle, or two or more rides travel in proximity to each other on two or more motorcycles. The microphone may be a standard noise reduction microphone, similar to those used now on motorcycle-to-motorcycle communication systems, or may be a bone conduction microphone.

The housing, which contains system circuitry, may be mounted on the exterior of a helmet. For motorcycle applications, the housing may be mounted on the left side of the rider's helmet for access to system controls. The housing may include integrated data input devices, such as push buttons, or the like. In one embodiment, the housing may include a power/mode button, an LED indicator light, and volume up/down controls. One or more of the buttons may also be used for connection and pairing to other devices, such as Bluetooth® devices. In another embodiment, the housing may also include a mute button and at least two context-sensitive control buttons, which may be used to control "paired" devices.

In one embodiment, the system may be powered by rechargeable batteries. A charger, such as a fast-charger may be used with the system to recharge the batteries.

Figure 9:
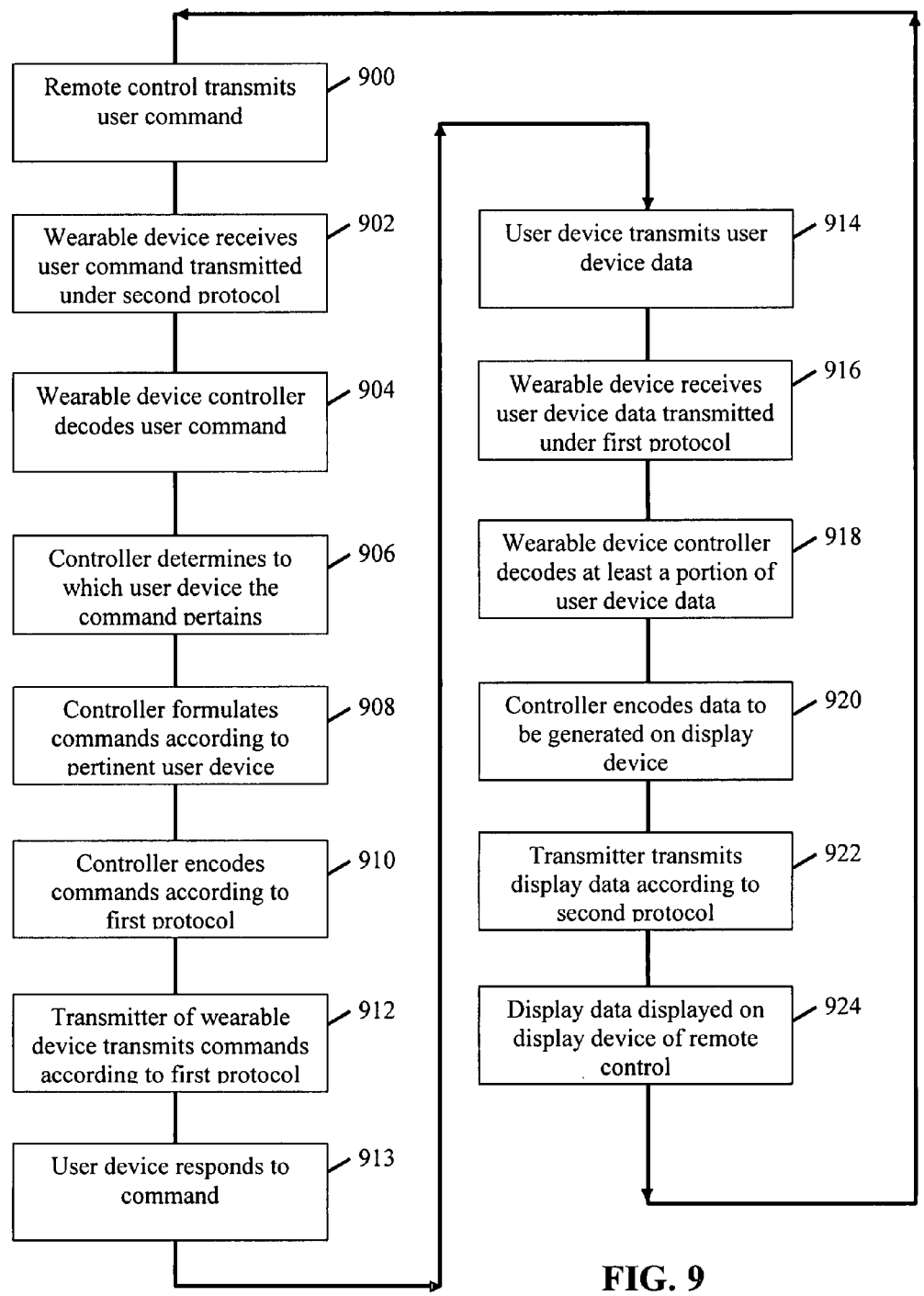
FIG. 9 is a flow diagram illustrating a method according to an embodiment of the invention.

FIG. 9 is a flow diagram illustrating a method according to an embodiment of the invention. A method of controlling a user device from, and/or displaying status or other data related to the user device on, a device other than the user device, in accordance with an embodiment of the invention, may proceed as follows. At 900, a remote control may transmit data corresponding to a user command. The remote control may transmit the data according to a second protocol. At 902, a user wearable device may receive the user command data transmitted according to the second protocol. At 904, a controller enclosed within the user wearable device may decode the user command data. At 906, the controller may determine to which user device, from a plurality of user devices, the command pertains. At 908, the controller may use the user command data to formulate commands according to rules applicable to the determined user device. At 910, the controller may encode the formulated commands according to a first protocol. The first and second protocols may be the same, however, in one embodiment the first and second protocols are different. The first protocol may be, for example, Bluetooth, while the second protocol may be, for example, a protocol used for transmission of commands from a key fob of an automobile, or from a garage door opener. The first protocol may be a protocol that is suitable for data requiring a bandwidth that is greater than the data transmitted according to the second protocol. At 912, a transmitter enclosed within the user wearable device may transmit the encoded commands according to the first protocol. The commands may be transmitted to a user device, such as, for example, a cellular telephone, an MP3 player, an iPod®, a radar detector, or a GPS navigation device. The user device may thus be controlled according to the command issued by its user.

At 914, in response, for example, to a user command, an external event (such as an incoming cellular telephone call or a radar alert), or of its own accord, the user device may transmit, according to the first protocol, user device data. At 916, the user wearable device may receive the user device data transmitted according to the first protocol. At 918, a controller enclosed within the user wearable device may decode at least a portion of the user device data. At 920, the controller may encode that portion of the decoded user device data (or may generate new data responsive to the decoded user device data) to be displayed on a display device of the remote control. For example, an incoming or outgoing telephone number, a flashing warning, or a song title may be displayed. The display could be, for example, a simple illumination of an LED, scrolling text on an LED array, or text and/or graphics on an LCD screen. At 922, a transmitter (or alternatively a transmitter portion of a transceiver) may transmit the display data according to the second protocol. At 924, the display data may be displayed on the display device of the remote control. It will be understood that the exemplary method described above could initiate with a transmission from a remote control device to a wearable device (other than the user device) or could initiate with a transmission from the user device to the wearable device.

Returning now to a description of one example of a system in accordance with an embodiment of the invention, a first system can be paired with a second system for full duplex rider/passenger communication, full duplex rider/rider communication, or with another device capable of transmitting and receiving under a selected communication protocol, such as Bluetooth®.

Multiple user devices may be controlled. In one embodiment, in order to better organize multiple audio sources, the category of data may be divided into three categories: Entertainment, Information, and Communications. A user may adjust relative volumes for multiple devices by category. In addition, the system may offer audio priorities for muting, or lowering the volume, for less critical audio, such as music, when communications that are more critical require attention, such as radar alerts. Each category may be assigned its own muting priority and relative volume. Table 1 may be one example of categorization of audio sources.

TABLE 1

| Device | Interface | Connection | Category | Priority |
| --- | --- | --- | --- | --- |
| Radar alerts; | Audio | line input | Information | 1 |
| Cell phone | audio, control | Bluetooth | Communications | 2 |
| GPS directions | Audio | line input | Information | 3 |
| Bike to Bike | TBD | TBD | Communications | 4 |
| iPod | audio, control | USB | Entertainment | 5 |
| MP3 player | Audio | line input | Entertainment | 6 |

By way of illustration only, a power button may operate as a multifunction button. If a unit is off, depressing and releasing the power button should turn the unit on. Additionally, an LED, signifying an "ON" power state, may be illuminated. Once on, the power button may be used for switching between multiple devices that may be connected/paired with the helmet-mounted system. For example, when the power button is depressed and released, the helmet-mounted system may cycle through its connected devices, advancing one device for each depression. Audible tones may be heard, indicating which device may be connected. To turn the helmet-mounted device off, a user may hold down the power button for a predefined amount of time, such as 5 seconds.

A Connect/Pair button may be used to connect/pair with devices. Because the headset unit may operate as both master and slave, the user may select the piconet to which he or she will connect. When the helmet mounted system is on, the user may click the Pair button either once or twice within a predefined time period, such as one-second period. If the helmet mounted system registers one click, it may function as a slave and will attempt to connect or pair with a master device that may be also attempting to connect or pair. If the helmet mounted system registers two clicks within the predefined period, it may function as a master and will attempt to connect or pair with a slave device that may be also attempting to connect or pair. If connection or pairing is not successful, or no device is within range, the indicator LED may remain off.

A Connect LED may flash while connecting or pairing, and return to a solid illumination when completed, or return to off if the connection failed. This single button can be used to change the helmet-mounted system's Bluetooth® topology while a user is in motion, such as when riding a motorcycle. The following examples offer descriptions of how topologies may be initiated:

Example 1

Two Helmet Mounted Systems

A Rider and Passenger turn on their Helmet Mounted Systems. One then clicks the Pair button once to attempt to pair as a Slave, while the other clicks the Pair button twice to pair as a Master. The Pairing LEDs may flash while pairing. When the LEDs on both units stop flashing, the devices should be paired, and secure Raider/Passenger communications should be enabled.

Example 2

Two Helmet Mounted Systems and an Audio Routing System

The Audio Routing System may function as a Master of each Helmet Mounted System. It may establish up to two piconets for two independently controllable helmet mounted systems. With both helmet mounted systems and the audio routing system turned on, the Rider may click twice on the Audio Routing System Channel 1 button and once on the helmet mounted system's Pair button. Once they may be paired, the Passenger may use the same method to pair with the Audio Routing System Channel 2. When both helmet-mounted systems may be paired, the Audio Routing System will act as a signal router and mixer for each of the helmet mounted system helmets.

User Scenarios

Scenario 1*a*—Helmet Mounted System and Cell Phone

A rider may pair the helmet-mounted system with a cell phone to place and receive phone calls.

Scenario 1*b*—Two Helmet Mounted Systems

When one helmet-mounted system may be set as a Slave and the other as a Master, the Rider and Passenger have full duplex communication capability using the built in audio and microphone.

Scenario 1*c*—Two Helmet-Mounted Systems and Cell Phone

The Rider and Passenger can communicate with each other, with one the Master and the other the Slave. Either can pair with the Cell Phone at any time. Once paired with the cell phone, the helmet-mounted system can switch from cell phone to Rider/Passenger communication with a push of the Power/Mode button. When in cell phone mode, Rider/Passenger communications remains connected, but all audio may be muted until the user pushes the button again to return to Rider/Passenger mode. Re-pairing to switch cell phone usage from Rider to Passenger can be done at any time (so long as a call may be not in progress) by pressing the pairing button on the helmet and initiating cell phone pairing. It may be not possible for both the rider and passenger to simultaneously access a single cell phone.

Scenario 1*d*—Two Helmet-Mounted Systems and Two Cell Phones

The Rider and Passenger can communicate with each other, with one the Master and the other the Slave. The rider may pair with one cell phone, and the passenger may pair with the other. Either Rider or Passenger may initiate his or her own cell phone mode independently. Either can switch from Rider/Passenger mode to Cell Phone mode by clicking the Power/Mode button. When in cell phone mode, Rider/Passenger communications remains connected, but all audio may be muted until the user pushes the button again to return to Rider/Passenger mode. It may be not possible for the rider and passenger to share a single phone call through this system (though conference calling through the cell phone may be not affected and can be used as an option).

Scenario 3*a*—Helmet Mounted System and Audio Routing System

The Rider pairs with the audio routing system as a Slave. All other devices either connect physically with the audio routing system through audio inputs, or through pairing. All devices may be simultaneously available to the Rider without the need for additional pairing or connecting.

Scenario 3*b*—Two Helmet-Mounted Systems and Audio Routing System

The Rider and Passenger pair with the audio routing system as Slaves. All other devices either connect physically with the audio routing system through audio inputs, or through pairing. The Rider and Passenger can communicate with each other, can share a cell phone for conference calls, and can simultaneously enjoy music from any of the audio sources. Should a private call be desired, either the Rider or Passenger can re-pair the cell phone directly with their helmet.

Scenario 4*a*—Helmet Mounted System and Audio Routing System and Remote Control Apparatus The Remote control apparatus may use a protocol other than Bluetooth, so it does not require a connection or pairing—it will begin to send and receive data from the audio routing system the moment it may be turned on. The Rider can adjust relative volumes for each device individually, and alter the audio priority for each class of device. The Rider can also receive status information from attached devices, and navigate playlists or address books.

Scenario 4*b*—Two Helmet-Mounted System and Audio Routing System and Remote Control Apparatus The Rider can use the Remote control apparatus interface and Set-up menu system to route devices, assigning them to Rider, Passenger or both on the fly as needed. The Rider can also adjust relative volumes for each device individually for the Rider and Passenger. The Rider can also receive status information from attached devices, and navigate playlists or address books.

The disclosed embodiments are illustrative of the various ways in which the present invention may be practiced. Other embodiments can be implemented by those skilled in the art without departing from the spirit and scope of the present invention.

What is claimed is:

1. A system, comprising:
    at least one speaker;
    a microphone;
    a first transceiver to operate under a first protocol, coupled to a first antenna;
    a second transceiver to operate under a second protocol, different from the first protocol, coupled to a second antenna;
    a controller coupled to the at least one speaker, the microphone, the first transceiver, and the second transceiver;
    a power source coupled to the controller, the first transceiver, and the second transceiver; and
    a remote device comprising an input device coupled to a transmitter, the transmitter to transmit data received from the input to the second transceiver under the second protocol,
    wherein the transmitted data causes the controller to transmit command data to a user device via the first transceiver under the first protocol, wherein the remote device further comprises a receiver and a display device, the receiver to receive data from the second transceiver under the second protocol, wherein the received data corresponds to a status of the user device to be displayed on the display device, and wherein the display device is at least one of an LED, an LED array, and an LCD screen.

2. The system of claim 1, wherein at least one of the first protocol and the second protocol is a short-range protocol.

3. The system of claim 2, wherein the short-range protocol is a Bluetooth protocol.

4. The system of claim 1, wherein the first antenna and the second antenna comprise a single antenna operable at both a frequency used by the first transceiver and a frequency used by the second transceiver.

5. The system of claim 1, wherein the at least one speaker, the microphone, the first transceiver, the second transceiver, the controller, the first antenna, the second antenna, and the power source are configured to be worn by a user.

6. The system of claim 1, wherein the at least one speaker, the microphone, the first transceiver, the second transceiver, the controller, the first antenna, the second antenna, and the power source are configured to be mounted to a head covering.

7. The system of claim 6, wherein the head covering is a motorcycle helmet.

8. The system of claim 1, further comprising a helmet, wherein the at least one speaker, the microphone, the first transceiver, the second transceiver, the controller, the first antenna, the second antenna, and the power source are mounted to the helmet.

9. The system of claim 8, wherein the helmet is a motorcycle helmet.

10. A system, comprising:
a audio assembly comprising a pair of stereo speakers, a microphone, a single multi-conductor cable that connects each of the stereo speakers and the microphone to a first connector via conductors;
a housing assembly comprising:
a housing to separate an exterior space outside of the housing from an interior space inside of the housing;
a first transceiver coupled to a first antenna;
a second transceiver coupled to a second antenna;
a controller coupled to the first and second transceivers; and
a battery coupled to the first and second transceivers and the controller, wherein the first and second transceivers, the first and second antennas, the controller, and the battery are enclosed within the interior space of the housing and are operably coupled to collectively receive, process, and transmit data; and
a second connector mechanically coupled to the housing and operably coupled to the first antenna and the second antenna, the second connector to connect to the first connector;
a resilient seal; and
a housing receptacle to:
retain the first connector,
accept a releasable mechanical engagement with the housing;
cooperatively, with the housing, maintain a connection between the first and second connectors when engaged with the housing; and
cooperatively, with the housing, maintain pressure on the resilient seal wherein the resilient seal is positioned between the housing and the housing receptacle.

11. The system of claim 10, wherein the first antenna and the second antenna are a single antenna operable at both a frequency used by the first transceiver and a frequency used by the second transceiver.

12. The system of claim 10, further comprising a head covering mechanically coupled to the audio assembly and the housing receptacle.

13. The system of claim 12, wherein the head covering comprises a helmet.

14. The system of claim 13, wherein the helmet is a motorcycle helmet.

15. The system of claim 10, further comprising a wireless remote control comprising an input device and a transmitter, the wireless remote control to transmit data received from the input device to the controller via the second transceiver, wherein the controller causes the first transceiver to transmit user device commands, responsive to the data, to a user device via the first transceiver.

16. The system of claim 15, wherein the wireless remote control further comprises a receiver and a display device, the display device to display a user device status received at the receiver from the controller via the second transceiver.

17. A method of controlling a user device, comprising:
receiving, from a remote control, data transmitted according to a second protocol, the data corresponding to a user input;
decoding the data;
encoding the decoded data according to a first protocol, different from the second;
transmitting, to a user device, the encoded data according to the first protocol;
receiving, from the user device, data transmitted according to the first protocol, the data comprising user device data;
decoding at least a portion of the user device data;
encoding, according to the second protocol, that portion of the decoded user device data corresponding to data to be displayed on the remote control;
transmitting, to the remote control, the encoded data to be displayed on the remote control according to the second protocol; and
displaying, on the remote control, the data to be displayed on the remote control.

18. The method according to claim 17, wherein at least one of the first protocol and the second protocol is a short-range protocol.

19. The method of claim 18, wherein the short-range protocol is a Bluetooth protocol.

* * * * *